US008228540B2

(12) United States Patent
Himpe

(10) Patent No.: US 8,228,540 B2
(45) Date of Patent: Jul. 24, 2012

(54) RASTERIZING VARIABLE AND NON-VARIABLE DATA FOR PRINTING

(75) Inventor: Johan Himpe, Lovendegem (BE)

(73) Assignee: Esko IP NV, Ghent (BE)

(*) Notice: Subject to any disclaimer, the term of this patent is extended or adjusted under 35 U.S.C. 154(b) by 709 days.

(21) Appl. No.: 12/178,409

(22) Filed: Jul. 23, 2008

(65) Prior Publication Data

US 2009/0033986 A1 Feb. 5, 2009

Related U.S. Application Data

(60) Provisional application No. 60/953,103, filed on Jul. 31, 2007.

(51) Int. Cl.
*G06F 3/12* (2006.01)
(52) U.S. Cl. ............... 358/1.15; 358/1.16; 358/1.17; 358/1.18; 715/243
(58) Field of Classification Search .......... 358/462, 358/1.15, 1.18, 540, 538, 450, 448, 1.16, 358/1.17; 382/174, 175, 176, 180, 282, 283, 382/284, 290, 291, 292, 307, 317; 715/243
See application file for complete search history.

(56) References Cited

U.S. PATENT DOCUMENTS

| 6,049,390 | A | 4/2000 | Notredame et al. ......... 358/1.15 |
| 6,654,147 | B1* | 11/2003 | Ramot ........................... 358/3.1 |
| 7,327,487 | B2* | 2/2008 | Prosi ............................ 358/1.16 |
| 7,949,945 | B2* | 5/2011 | Dreyer et al. .................. 715/234 |
| 2005/0162676 | A1* | 7/2005 | Aoki ............................ 358/1.13 |
| 2008/0018935 | A1* | 1/2008 | Gauthier et al. ............. 358/1.18 |
| 2008/0165382 | A1* | 7/2008 | Ferlitsch ..................... 358/1.15 |

* cited by examiner

*Primary Examiner* — Charlotte M Baker
*Assistant Examiner* — Aaron R Gerger
(74) *Attorney, Agent, or Firm* — Dov Rosenfeld; Inventek

(57) ABSTRACT

A method, an apparatus, and computer-readable medium with instructions to carry out a method. The method is to rasterize variable and non-variable content for multiple instances of a page and includes dividing a page is into a plurality of non-overlapping parts including variable content. The method includes rasterizing the page with no variable content present into a rasterized fixed page that includes for at least any part that has no variable content a rasterized fixed image. The method further includes identifying one or more parts of the plurality of parts of the page that have variable content, and rasterizing each instance of the page with the variable elements of the page instance into a rasterized instance that includes, for each part that has variable content, a rasterized variable image that includes the variable content and any non-variable content of the instance. The generated rasterized fixed images and rasterized variable images for each instance are combinable.

28 Claims, 10 Drawing Sheets

RASTERIZING VARIABLE AND NON-VARIABLE DATA FOR PRINTING

RELATED APPLICATIONS

The present invention claims priority and is a conversion of U.S. Provisional Patent Application No. 60/953,103 filed Jul. 31, 2007 to inventor Johan Himpe, titled RASTERIZING VARIABLE AND NON-VARIABLE DATA FOR PRINTING. The contents of such provisional patent application are incorporated herein by reference.

FIELD OF THE INVENTION

The present disclosure relates generally to digital printing of multiple instances of pages containing variable information with unrestricted variability across pages. More particularly, this invention relates to a method, an apparatus, and logic encoded in at least one computer-readable tangible medium to carry out a method to rasterize variable and non-variable information for multiple instances of a page.

BACKGROUND

Recent digital printing devices have made it possible to print pages which are completely different from one another. A page is typically described using a page description language (PDL) such as PostScript PDL and "PDF" by Adobe Systems, Inc., Mountain View, Calif. A PDL file typically includes a list of commands which, when interpreted, generate graphical objects such as text, images, etc. Variable data printing is a form of printing that produces individualized printed pages containing information that varies from instance to instance, each instance targeted, for example, to an individual recipient. With variable printing, each page can contain variable data with unrestricted variability from page to page.

Generally, existing tools for printing multi-page documents define each page as a collection of page elements where each page element is defined in PDL as part of a page description file. Each page element of a page is rasterized using a raster image processor to generate a bitmap image. The rasterization includes interpreting the objects defined in a PDL file and generating a set of images corresponding to the objects. Finally, the page elements are merged together into a larger image, typically during printing. In such architecture, the number of page elements in a page can vary from page to page. Therefore the time to generate each page and hence the print performance is unpredictable. Also, a color management system is usually applied to all page elements of a page before printing. In existing systems, a color management system is typically applied separately to different elements, e.g. to variable data regions and to fixed data regions. This can give undesirable results in areas where the different elements overlap each other after merging.

Thus, in printing pages with multiple page elements, there is a need for a method and an apparatus that improves the predictability of the time required to merge data for a page. There is also a need to be able to correctly apply color management to resolve issues that might occur in regions of overlapping page elements.

BRIEF DESCRIPTION OF THE DRAWINGS

IN FIG. 3A, each part in the form of a rectangular tile, and each tile is the same size.

DESCRIPTION OF EXAMPLE EMBODIMENTS

Overview

Figure 1:
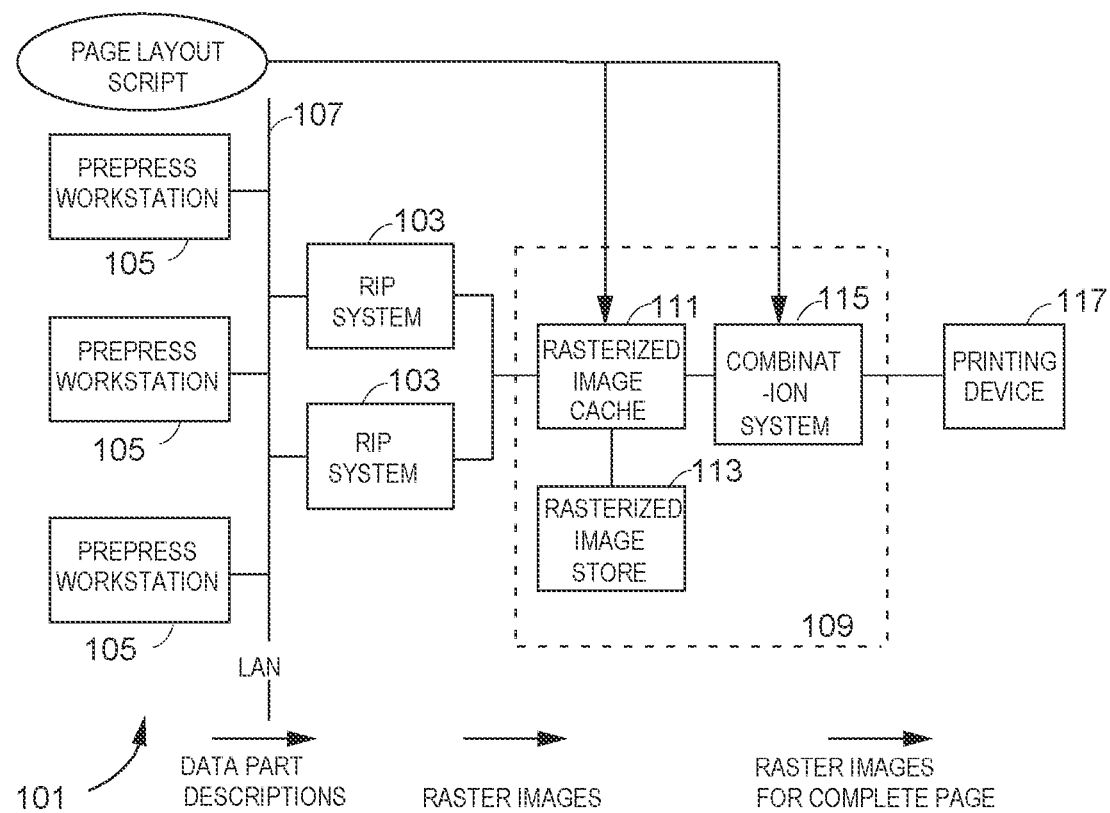
FIG. 1 shows a typical system for document production which includes an embodiment of the present invention.

Embodiments of the present invention include a method, an apparatus, and logic encoded in at least one computer-readable tangible medium to carry out a method. The method is to rasterize variable and non-variable content for multiple instances of a page and to combine rasterized content for a page that can vary from instance to instance.

Particular embodiments include a method of operating a processing system to process a job for printing. The printing is to generate multiple variable instances of one or more pages. The job contains one or more pages that in one embodiment are each described using a PDL. At least one page includes a plurality of elements of which some elements—fixed elements—are fixed from instance to instance, and some elements—variable elements—may vary from instance to instance. In one embodiment, each element is described in the PDL.

In one embodiment, that has one or more variable elements, the method includes dividing a page into a plurality of non-overlapping parts of which at least one part includes variable content that has one or more variable elements or portions thereof in at least one instance. The method for the page also includes rasterizing the page with no variable content present into a rasterized fixed page that includes, for any part that has no variable content, a rasterized fixed image. The method for the page further includes identifying one or more parts of the page that have variable content, and rasterizing each instance of the page with the variable elements of the page instance into a rasterized instance that includes, for each part that has variable content, a rasterized variable image that includes the variable content of the instance and any non-variable content. The generated rasterized fixed images and rasterized variable images for each instance are combinable to form a rasterized instance of the page. Particular embodiments include an apparatus operative to generate multiple variable instances of one or more pages for an output device such as a printer. At least one page includes a plurality of elements of which some are fixed across instances, and some vary from instance to instance. An embodiment of the apparatus includes a part former configured to divide at least one page into a plurality of non-overlapping parts of which at least one part includes variable content that has one or more variable elements or portions thereof in at least one instance.

The apparatus further includes a rasterizer coupled to the part former and configured to rasterize the page with no variable content present into a rasterized fixed page that includes for at least any part that has no variable content a rasterized fixed image. The rasterizer is also configured to identify one or more parts of the page that include variable content; and to rasterize each instance of the page with variable elements into a rasterized instance that includes a rasterized variable image for each part that has variable content. The rasterized variable image includes the variable content and any non-variable content of the instance. The rasterized fixed and rasterized variable images generated for each instance are combinable to form a rasterized instance of the page.

In one alternate embodiment, the rasterizer is implemented as software running on a processor. In another, the rasterizer is implemented to include hardware circuitry. The hardware circuitry in one version is hard wired, and in another includes one or more programmable elements. In one version, a programmable element includes a processor programmed to carry out the rasterizing function.

One embodiment of the apparatus includes a raster image processor (RIP) implemented as a processing system including a computer readable medium on which are encoded instructions that when executed, cause implementing a raster image processing method that processes a job of variable printing in two phases to generate raster images. The method includes two passes operating on a page divided into a plurality of non-overlapping parts, of which at least one part includes variable content that has one or more variable elements or portions thereof in at least one instance:

Pass a: Rasterizing the page with no variable content present into a rasterized fixed page that includes for at least any part that has no variable content a rasterized fixed image. One example includes combining and rasterizing the background of all the pages in a job in a single pass.

Pass b: Identifying one or more parts of the page that include variable content, and rasterizing each instance of the page with the variable elements of the page instance into a rasterized instance that includes for each part that has variable content a rasterized variable image that includes the variable content and any non-variable content of the instance. In one implementation, rasterizing the part with the variable content excludes any fixed content in the part and processes only the variable content of the part to form a combined variable part.

The combined variable part can then be combined with a corresponding rasterized fixed image to form the rasterized variable image.

In another embodiment, the raster image processor also is operative to combine the fixed and variable elements of each instance of a page that has one or more variable elements.

In one version, color management is applied as an option to the parts that have one or more variable elements or portions thereof such that the rasterized variable images are stored after color management. Color management is applied as an option to the parts with no variable content such that rasterized fixed images are stored after color management. The rasterized fixed images can then be combined with the rasterized variable images for each variable instance to form a rasterized page for the variable instance.

In one implementation, each part is in the form of a rectangular tile of a fixed size. The tiles include fixed tiles and variable tiles. The fixed tiles correspond to parts of a page with no variable content whereas the variable tiles correspond to parts of the page that have variable content in at least one instance.

In one embodiment, the parts are rectangular tiles of a fixed size, such that the tiles include fixed tiles and variable tiles, the fixed tiles corresponding to parts of the page with no variable content present and the variable tiles corresponding to the parts that have variable content.

Particular embodiments include a computer readable storage medium on which are encoded instructions that when executed by one or more processors of a processing system cause carrying out a method of processing a job for printing, the printing to generate multiple variable instances of one or more pages, at least one page including a plurality of elements of which some are fixed from instance to instance, and some may vary from instance to instance. The method includes, for a page that has one or more variable elements, dividing the page into a plurality of non-overlapping parts, of which at least one part includes variable content that has one or more variable elements or portions thereof in at least one instance. The method further includes rasterizing the page with no variable content present into a rasterized fixed page that includes for at least any part that has no variable content a rasterized fixed image, identifying one or more parts that include variable content; and rasterizing each instance of the page with the variable elements of the page instance into a rasterized instance that includes for each part that has variable content a rasterized variable image that includes the variable content and any non-variable content of the instance. The rasterized fixed images and the rasterized variable images of each instance are combinable to form a rasterized instance of the page. Particular embodiments include system for processing a job for printing, the printing to generate multiple variable instances of one or more pages, at least one page including a plurality of elements of which some elements are fixed across instances of the page and some elements vary from instance to instance. The system includes means for dividing a page into a plurality of non-overlapping parts, of which, in the case the page includes one or more variable elements, at least one part includes variable content that has one or more variable elements or portions thereof in at least one instance. The system further includes means for rasterizing the parts of the page with no variable content into corresponding rasterized fixed images; means for deducing one or more parts of the plurality of parts of each variable instance of the page that have variable content; and means for rasterizing the parts with variable content for each instance of the page into corresponding rasterized variable images that include the variable content and any non-variable content of the part. The rasterized fixed images and the rasterized variable images of each instance are combinable to form a rasterized instance of the page.

One feature of an embodiment of the invention that includes a raster image processor is that the raster image processor does not process the entire variable instance every time, but only processes parts containing variable content. This makes the rasterization procedure faster and also saves memory or storage. Another feature of an embodiment of the invention is that the overlapping of fixed elements with variable elements is resolved during rasterization of the parts that have variable elements and thus gives the correct output when color management is applied. Yet another feature of one embodiment of the invention is the better predictability of printing speed. Because the variable parts have been pre-combined, the amount of data in them is predictable and known, and the print speed of a job containing variable elements is comparable to a job with no variable elements.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

Description of Embodiments

The described embodiments of the invention can be used as part of a complete system for preparing data for printing on a printing process based on a digital printing press. An example of such a system is illustrated as 101 in FIG. 1. Following is a general description of the components of such a system and of the interactions between those components. Following the general description, components of one raster image processing system shown as RIP system 103 inside the dashed box that includes elements of an embodiment of the invention, are described in detail.

FIG. 1 is the starting point of the description of one embodiment, and is by no means the only possible configuration, or the only way element 103 may be used in a complete system.

The Prepress Workstation 105

Three workstations denoted as 105 are shown in FIG. 1, all connected to a local area network ("LAN") 107. More or fewer workstations may be part of the system. Each workstation 105 may be a standard computer, and may contain several software modules, including prepress software such as Adobe Illustrator, Adobe Photoshop and/or Adobe Pagemaker, by Adobe, Inc. of Mountain View, Calif., and/or QuarkXpress, by Quark, Inc., of Denver, Colo. An overall document, called a book, is designed. The prepress software is used by a designer to create different individual page elements that make up the pages of the book. Each page includes one or more page elements some of which are fixed from instance to instance and some of which vary across instances. By "fixed elements" of a page is meant page elements that are fixed from instance to instance of the page, and by "variable elements" is meant page elements that might vary from instance to instance of the page. In one embodiment, the page elements are stored in PDL form, e.g., in a storage subsystem coupled to or part of one or more of the workstations.

The designer specifies the overall design of a book in a page layout script. The page layout script maps for each page, the set of page elements required by the page and such page elements are processed from the corresponding PDL files by the methods known in the art.

Note that two individual rasterizers are shown in the system of FIG. 1 as part of the RIP system 103 connected to LAN 107, but more or fewer rasterizers can be used, or the RIP system 103 may be implemented as software operating in the workstation 105, or implemented as software in a computer system which embodies the invention.

The RIP System 103

The fixed elements and the variable elements of each page are combined according to the script and input to one or more rasterizers that are part of a RIP system 103 that is operative to rasterize data into rasterized data suitable for input to a printing device. FIG. 1 shows the rasterizing including the elements that are stored being retrieved for the RIP system 103 from the storage via a local area network (LAN) 107. This clearly is not the only possible configuration. For example, there may be direct coupling of the RIP system 103 to the storage subsystem in which the elements and the script are stored. Thus, one embodiment includes forming multiple instances of each of the pages, some including variable data.

One method embodiment includes dividing each page into a plurality of non-overlapping parts, of which at least one part includes variable content that has one or more variable elements or portions thereof in at least one instance.

Figure 2:
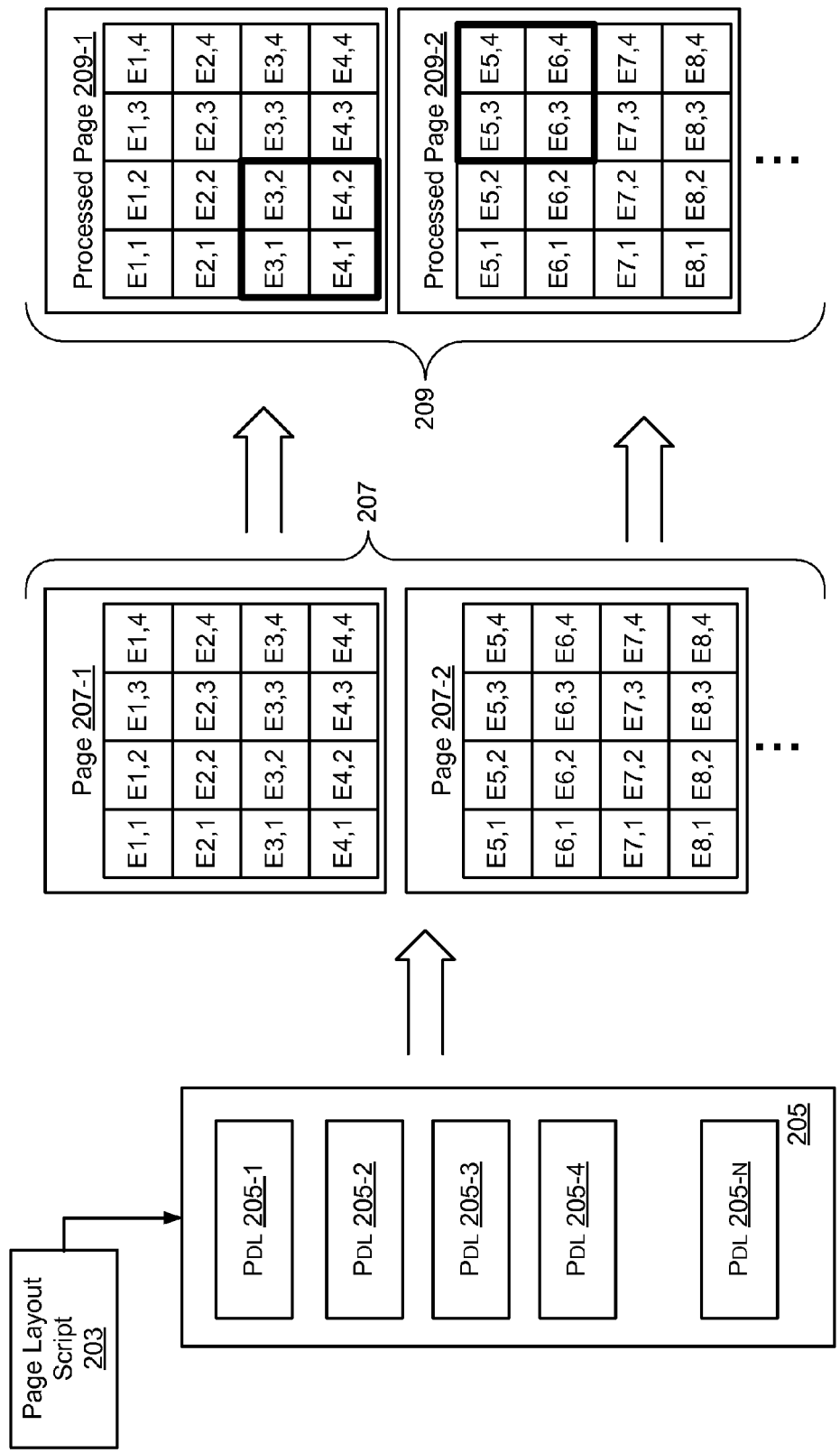
FIG. 2 illustrates an example of division of a page into one or more non-overlapping parts according to an embodiment of the present example.

FIG. 2 is a simple illustration an example of division of a page into a plurality of non-overlapping parts. Each part includes one or more page elements. A page layout script 203 is used to map a number, denoted N, N being one or more PDL files 205-1, 205-2, . . . , 205-N, collectively referred to as 205 hereinafter, to one or more pages. In one embodiment, the page layout script 203 is a text description which is an ordered list of books. Each book includes an ordered list of pages, and each page includes an ordered list of page elements and the locations and ordering of the page elements. The books form what we call a job, which might include a plurality of books, or only one book, and each book has one or more pages. The page elements described in the page layout script have corresponding page description language (PDL) files 205. The page description files 205 with the mapping information in the page layout script 203 form the elements of the pages 207-1, 207-2, collectively referred to as 207 hereinafter. Each page of the pages 207 includes a plurality of elements numbered E1,1, . . . , E4,4 for the page 207-1, and E5,1, . . . , E8,4 for the page 207-2. The page elements are collectively referred to as E hereinafter. For any one page, some of the elements are fixed from instance to instance and some elements may vary from instance to instance.

One embodiment of the invention operates on parts of a page. Each instance of the multiple pages 207 of the job is divided into a plurality of non-overlapping parts.

In one embodiment, the dividing of each page instance into non-overlapping parts is carried out by the RIP system 103. In another embodiment, the method of dividing of each page instance into non-overlapping parts is carried out in the one or more workstations that run the prepress software.

The dividing of the pages 207 into a plurality of parts results in processed pages 209-1, 209-2, and so forth, with each page divided into a plurality of non-overlapping parts, e.g. rectangular tiles. Each part, e.g., tile of the plurality of parts includes one or more page elements, e.g., text and/or graphics. For example, a part formed in an instance of page 209-1 includes instances of the page elements E3,1, E3,2, E4,1 and E4,2. Similarly a part formed in an instance of the page 209-2 includes the page elements E5,3, E5,4, E6,3 and E6,4. The page elements are shown non-overlapping and also whole. However, those in the art will understand that this is only for convenience. That is, there may be multiple layers, each having elements, such that the elements may overlap, and furthermore, elements may extend beyond part boundaries, such that a part may have only a portion of one or more elements. The dividing each page into a plurality of non-overlapping parts, e.g., rectangular tiles is such that for at least one page that has one or more variable elements, one part, e.g., tile includes variable content that has one or more variable elements or portions thereof in at least one instance.

The following discussion will be for this one page that has one or more variable elements.

One method embodiment includes the RIP system 103 rasterizing the page with no variable content into a rasterized fixed page that includes for at least any part that has no variable content a rasterized fixed image.

One method embodiment further includes identifying one or more parts that include variable content, and the RIP system 103 rasterizing each instance of the page with the variable elements of the page instance into a rasterized instance that includes for each part that has variable content a rasterized variable image that includes the variable content and any non-variable content of the instance. Thus, fixed images are formed, and variable images are formed. A rasterized page instance is made up of some fixed images and some variable images. Thus, the rasterized fixed images and the rasterized variable images of each instance are combinable to form a rasterized instance of the page.

In one implementation, rasterizing the part with variable content excludes any fixed content in the part and processes only the variable content of the part to form a combined variable part. The combined variable part can then be combined with a corresponding rasterized fixed image of the part to form the rasterized variable image.

Figure 3A:
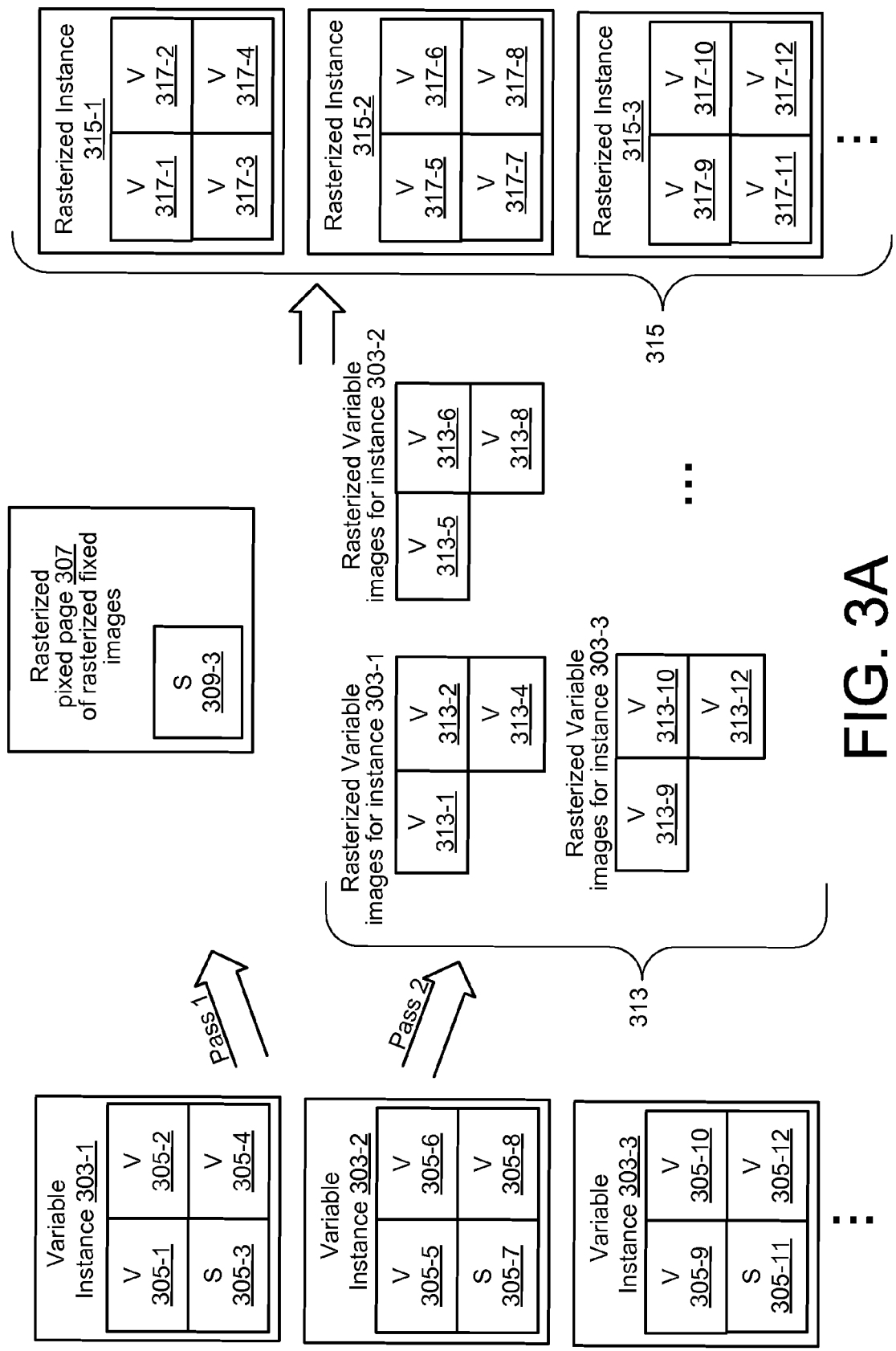
FIG. 3A illustrates an example of rasterization of parts of a page having multiple variable instances into one or more rasterized images according to an embodiment of the present example.

FIG. 3 is an example of rasterization of parts of a page into rasterized images. Several instances of a page are show, such instances denotes by 303-1, 303-2, 303-3, . . . , collectively referred to as page instances 303 hereinafter. Each instance contains a plurality of non-overlapping parts, e.g., 305-1, 305-2, 305-3, 305-4 for instance 303-1, 305-5, 305-6, 305-7, 305-8 for instance 303-2, 305-9, 305-10, 305-11, 305-12 for instance 303-3, respectively, and so forth. At least one part of the page includes variable content that has one or more variable elements or portions thereof in at least one instance.

Suppose for purpose of illustration, parts 305-3 is the same in each instance. This is referred to as an S part hereinafter. In one embodiment, the rasterizing occurs in two passes. A first pass includes rasterizing, e.g., by the RIP(s), the page with no variable content present into a rasterized fixed page 307 that includes for at least any part that has no variable content a rasterized fixed image. In the example shown, a rasterized first image 309-3 of the part that only has fixed content is shown. In general, the rasterized fixed images are collectively referred to as 309 hereinafter. The parts that include variable content are identified and in a second pass, each instance of the page with the variable elements of the page instance are rasterized, e.g., by the RIP(s) into a rasterized instance that includes for each part that has variable content, a rasterized variable image that includes the variable content and any non-variable content of the instance. FIG. 3 shows how the three instances 303-1, 303-2, and 303-3 of only the parts that have any content that varies in the instances are rasterized into sets of variable images 313 that include, for instance 303-1, rasterized variable images 313-1, 313-2, and 313-4 respectively corresponding to variable parts 305-1, 305-2, and 305-4, rasterized variable images 313-5, 313-6, and 313-8 respectively corresponding to variable parts 305-5, 305-6, and 305-8, and rasterized variable images 313-9, 313-10, and 313-12 respectively corresponding to variable parts 305-9, 305-10, and 305-12, and so forth.

In one embodiment, each part of a page is a rectangular non-overlapping part, with the parts of the page equal in size, and abutting. In one such version, the RIP system 103 stores the rasterized fixed image(s) corresponding to the part(s) of a page with no variable content as output fixed tiles. The RIP system 103 stores the rasterized variable images 313 corresponding to the parts of the page with variable content for each variable instance 303 in output variable tiles. Each instance of the page thus is made up of the output fixed tiles and output variable tiles. The output fixed tiles and the output variable tiles for each variable instance of the page are identified and combined to form a rasterized page for the variable instance 315-1, 315-2 and 315-3, collectively referred to as 315 hereinafter. Each rasterized page 315, also referred to as rasterized instance includes combined output fixed tiles 317-3, 317-7, 317-11 and combined output variable tiles 317-1, 317-2, 317-4, 317-5, 317-6, 317-8, 317-9, 317-10, 317-12. In another embodiment, the combination of the output fixed tiles and the output variable tiles for each variable instance of the page can be done in a combination system 115.

In one embodiment, color management is applied. As the rasterization is of complete parts that, for any instance, are combinable to form the instance of the page, color management can be applied to complete parts. Compare this to some alternate variable printing systems, in which individual elements are rasterized and combined on the fly. When combined to form instances of a page, some of the elements in such a system might overlap. If color management was applied to the individual elements, combining overlapping elements may cause erroneous results.

While in one implementation, each part is in the form of a rectangular tile of a fixed size, the tiles abutting to form a page, in another implementation, the fixed part includes all the regions of the page that have no variable element in any instance. Therefore, the fixed part is a page with "holes" where there is variable content in at least one instance. The variable parts are, for each instance, the parts that fill the "holes" in the fixed part.

Figure 3B:
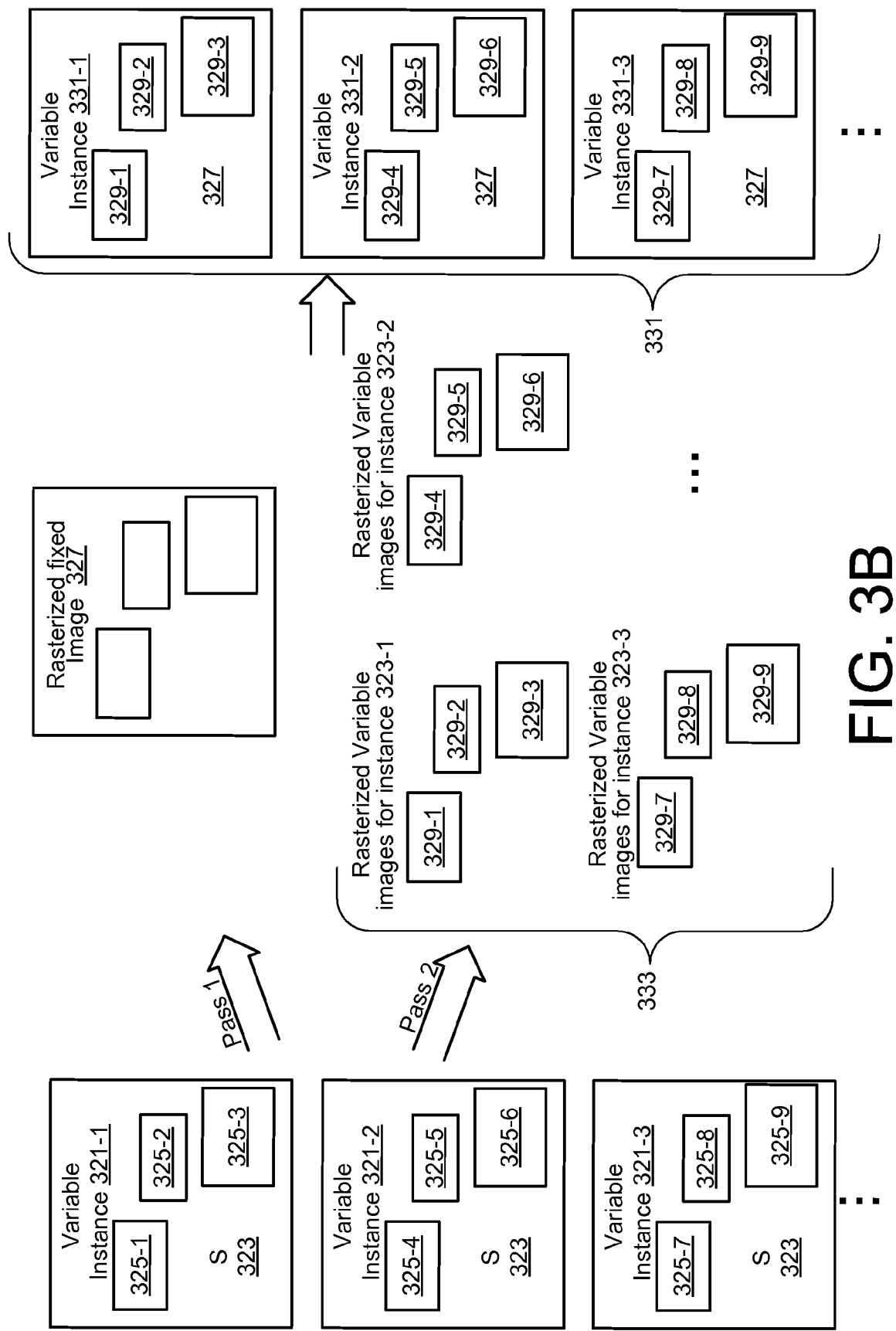
FIG. 3B illustrates a different example in which the tiles are no necessarily the same size.

FIG. 3B shows an example of such a situation. The page instances are shown as: 321-1 with fixed part 323 and variable parts 325-1, 325-2, and 325-3; 321-2 with fixed part 323 and variable parts 325-4, 325-5, and 325-6; 321-3 with fixed part 323 and variable parts 325-7, 325-8, and 325-9; and so forth. The dividing into parts includes position information for each part. The fixed part 323 without the parts that have at least a portion of an element that is different in at least one instance is rasterized to form a rasterized fixed mage 327. Note the "holes" in the rasterized fixed image 327. The variable parts—those parts that have at least a portion of an element that is different in at least one instance—are rasterized to form the rasterized variable images of each instance: 329-1, 329-2, and 329-3 as the rasterized variable images for instance 321-1; 329-4, 329-5, and 329-6 as the rasterized variable images for instance 321-2; 329-7, 329-8, and 329-9 as the rasterized variable images for instance 321-3; and so forth.

The rasterized fixed image and the rasterized variable images of each instance are combinable to form the rasterized instances denoted 331. Thus, FIG. 3B shows rasterized (variable) instances 331-1, 331-2, 331-3, and so forth.

While in one embodiment the parts, e.g., variable parts are rectangular, alternate embodiments have other shapes.

Again because the fixed and variable images that are combinable already combine elements that may be in different layers and that may be overlapping, so that the fixed and variable parts are non-overlapping, applying color management to each rasterized image is possible without errors occurring due to the combining.

The Rapid Combination System 109

One embodiment includes a rapid combination system 109. In one version, the rapid combination system 109 includes a rasterized image cache 111, a rasterized image store 113, and a combination system 115. In an alternate version, there is no cache, and the rasterized image store is included as part of the RIP system 103. One embodiment of the RIP system 103 and the rapid combination system 109 is implemented on a computer called the assembler computer herein. The RIP system 103 and the rapid combination system 109 can also be implemented on different assembler computers. In particular, one embodiment of the method of the present invention includes steps performed by the assembler computer executing a software program, and one embodiment of the apparatus of the present invention includes the assembler computer or components thereof, including a memory loaded with software instructions causing the assembler computer to operate in a particular way.

Figure 4A:
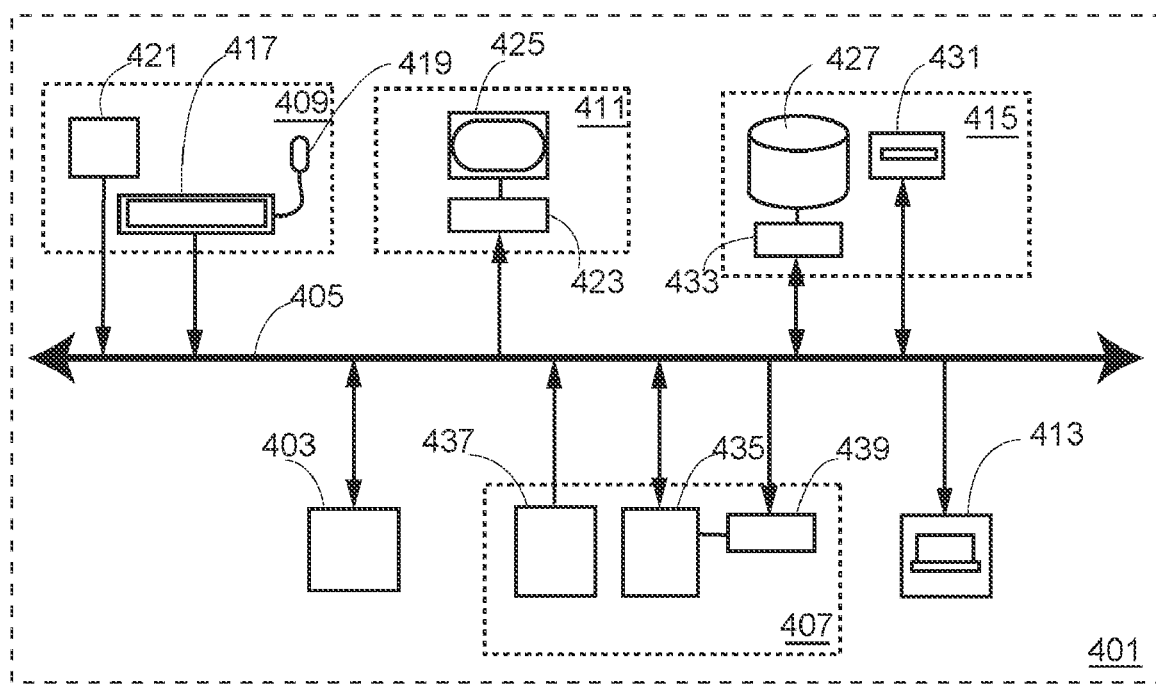
FIG. 4A shows in simple form a block diagram of a typical computer system in which an embodiment of the present invention may be embodied.

FIG. 4A is a simplified block diagram of a computer system 401 which can be used for the assembler computer in which elements of the present invention may be embodied. While computer system configuration of the assembler computer illustrated at this high level is standard, and without any software may be prior art, a computer system such as system 401, suitably programmed to embody part of all of the present invention, however, is not prior art.

While the remaining description will generally assume that elements of the invention are embodied in a computer such as computer system 401, the invention or parts thereof may alternately be embodied in dedicated devices such as printer servers, and printer controllers. Some of these devices may include many of the elements that also are in a general computer system such as computer system 401. It should be noted that in one embodiment, the prepress workstation(s) 105 also is a general purpose computer system which, in general, could have the same architecture as that of FIG. 4A. In some implementations, for example, the prepress workstation 105 may be implemented on the same assembler computer as the RIP system 103 and the rapid combination system 109.

Assembler computer system 401 includes a processor 403 that is coupled to a number of subsystems via a bus subsystem 405. These subsystems typically include a memory subsystem 407, a user input facility 409, a display subsystem 411, output devices such as a printer 413, and a file storage system 415. Not all of these subsystems need be included in all embodiments of the invention. In this context, the term "bus subsystem" is used generically so as to include any mechanism for letting the various components of the system communicate with each other as intended. With the exception of the input devices and the display, the other components need not be at the same physical location. Thus, for example, portions of the file storage system could be connected via various local-area or wide-area network media, including telephone lines. Similarly, the input devices and display need not be at the same location as the processor, although it is anticipated that versions of the present invention will most often be implemented in the context of personal computers ("PCs") and workstations.

Bus subsystem 405 is shown schematically as a single bus, but a typical system has a number of buses such as a local bus and one or more expansion buses (e.g., ADB, SCSI, ISA, EISA, MCA, NuBus, PCI, PCI-Express, etc.), as well as serial and parallel ports. Network connections are usually established through a device such as a network adapter on one of these expansion buses or a modem on a serial port. The computer system may be a desktop system or a portable system or an embedded controller.

Memory subsystem 407 includes a number of memories including a main random access memory ("RAM") 435 and a read only memory ("ROM") 437 in which fixed instructions are stored. In some embodiments, DMA controller 439 may be included. DMA controller 439 enables transfers from or to memory without going through processor 403.

User input facility 409 typically includes a keyboard 417 and may further include a pointing device 419 and a scanner 421. The pointing device may be an indirect pointing device such as a mouse, trackball, touchpad, or graphics tablet, or a direct pointing device such as a touchscreen incorporated into the display. Display subsystem 411 typically includes a display controller 423 and a display device 425 coupled to the controller. The display device may be a cathode ray tube ("CRT"), a flat-panel device such as a liquid crystal display ("LCD"), or a projection device. The display controller provides control signals to the display device and normally includes a display memory (not shown in the figure) for storing the pixels that appear on the display device.

The file storage system 415 provides persistent (non-volatile) storage for program and data files, and typically includes at least one hard disk drive 427. One or more of the disk drives 427 may be in the form of a random array of independent disks ("RAID") system, while others may be more conventional disk drives. The disk drive 427 may include a cache memory subsystem 433 which includes fast memory to speed up transfers to and from the disk drive. There may also be other devices such as a CD or DVD drive 431 and other optical drives. Additionally, the system may include hard drives of the type with removable media cartridges. As noted above, one or more of the drives may be located at a remote location, such as in a server on a local area network or at a site on the Internet.

Figure 4B:
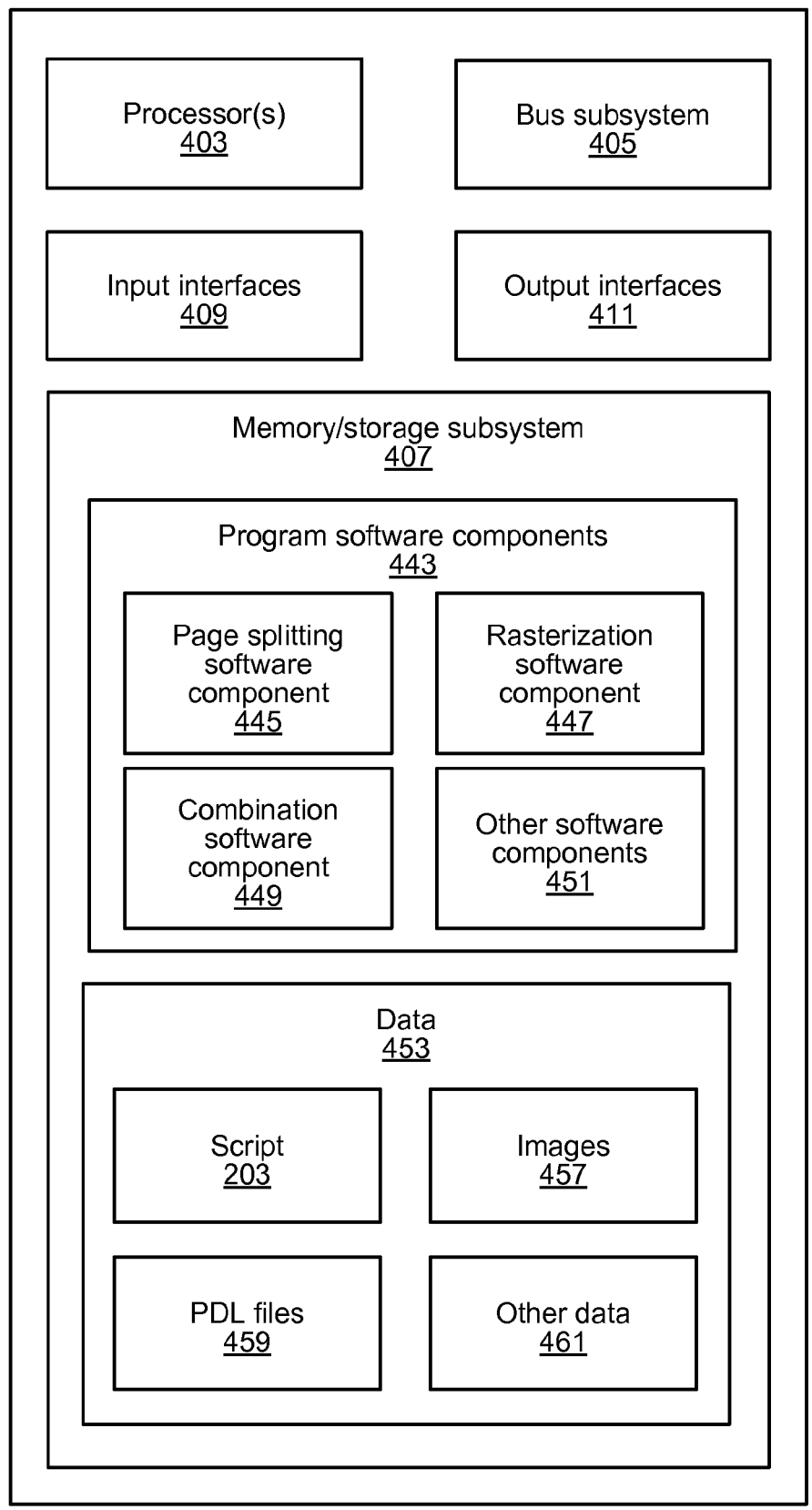
FIG. 4B is an alternate view of the computer system, including software modules for rasterization of variable and non-variable data for printing according to an embodiment of the present example.

FIG. 4B illustrates an alternate representation of various components of the example computer system 401. The system 401 can include, but is not limited to, a processor 403, a bus subsystem 405, an input interface 409, and an output interface 411.

The memory subsystem 407 typically includes data and/or software programs for rasterizing variable and non-variable data for a job of variable printing that are immediately accessible to and/or presently operated on by processor 403. It should be noted that while FIG. 4B shows all of the software components completely in the memory subsystem 407, those in the art will understand that in an actual implementation, at any one time, not all of the software may be loaded in the memory subsystem 407, and some of the software would be in the storage subsystem 415. However, for the sake of simplicity in explaining, all of the software is shown to be in the memory subsystem 407.

In one embodiment, the system 401 includes, e.g., in memory subsystem 407 a page splitting software component 445, a rasterization software component 447, and a combination software component 449. Other software components 451 are included, and may include software that assists in the functioning of the computer system 401, such as an operating system.

In addition to program software components, data 453 is included in the computer. In the case a single computer system 401 is used for both the creation of workstation 105, the RIP system 903, and the combination system 109, the data 453 include the script 203, images 457, PDL files 459, and other data 461 specific to the system or the application.

In one implementation, the page splitting software component 445 divides each page of one or more pages of a job for variable printing into a plurality of non-overlapping parts. Typically, for variable printing, at least one page has at least one part including variable content that has one or more variable elements or portions thereof in at least one variable instance. The rasterization software component 447 rasterizes the parts of the page with no variable content into rasterized fixed images 309. The rasterization software component 447 rasterizes the parts of the page with variable elements into rasterized variable images 313 for each variable instance of the page.

The combination software component 449 combines for each instance, the rasterized fixed images 309 stored as output fixed tiles and the rasterized variable images 313 stored as output variable tiles to form a rasterized page for the variable instance.

Unless specifically stated otherwise, as apparent from the following discussions, terms such as "processing," "computing," "calculating," "determining" or the like refer to the action and/or processes of a computer, a computing system, or a similar electronic computing device, that manipulates and/or transforms physical data. In a similar manner, the term "processor" may refer to any device or portion of a device that processes electronic data from registers and/or memory to transform that electronic data into other electronic data that may be stored in registers and/or memory. A "computer", a "computing machine", and a "computing platform" may include one or more processors.

The Rasterized Image Cache 111 and Rasterized Image Storage 113

One embodiment is designed for real time printing. Referring to FIG. 1, a printing device 117 is coupled to the rest of the system. Page instances are created and printed in real time. In such an application, the RIP system 103 may not be able to keep up with the printing device 117. Therefore, in one embodiment, rasterized images received from the RIP system 103 are stored as files on a rasterized image storage unit 113 which, in one embodiment, is a RAID system. Such RAID system is given the same reference numeral 427 as any other disk drive in the file storage system which may include many disk drive units. Note that rasterized image store 113 may alternatively be implemented in one of many ways: as a disk store, a RAID system, a fast optical store, etc. Printing starts as soon as all the raster images for a certain job are available. For the system to operate with no additional means, the main requirement for rasterized image store 113 is that it must have enough bandwidth, so that the combination process of combination system 115 can retrieve the object data at the speed of the printing device 117. Normally this might not be possible without some additional means. In one embodiment, a buffering system is used to alleviate this speed requirement. That is, as shown in FIG. 1, the rasterized images are not written directly to element store 113, but rather to a buffer which is part of a rasterized image cache memory 111. Rasterized image cache memory 111 handles all the communication between rasterized image store 113 and the rest of the system, and includes several structures implemented as part of RAM 435. The buffer between the RIP system 103 and page element storage 113 is one such structure. Another part of the cache 111 deals with transfer of the rasterized variable images and the rasterized fixed images from the rasterized image store 113 to the combination subsystem 115 and will be described more fully later. The buffer in rasterized image cache 111 is for using the bandwidth of rasterized image storage 113 in an efficient way. Rasterized parts, e.g., rasterized tiles of a page are buffered in the rasterized image cache 111. These rasterized parts may or may not also be stored in the rasterized image storage 113, depending on whether the combination process carried out by combination system 115 needs or does not need the bandwidth of the rasterized image storage 113. In one embodiment in which rasterized image storage 113 includes one or more disk drives, such need is indicated by whether or not the disk is idle. In an improved embodiment, the user can indicate that some rasterized images will be printed only once, so those objects are not written into rasterized image storage 113, but left in the buffer of rasterized image cache 111, together with some flag or other means of communicating this to the combination subsystem 115. When the part of the combination system 115 that reads data from storage seeks such a rasterized image, it then does not need to retrieve it from rasterized image store 113, thus saving two disk accesses.

The other aspects of rasterized image cache 111 deal with retrieval by the combination system 115 of the rasterized fixed and rasterized variable images from rasterized image store 113. In one version, rasterized fixed images that can be used multiple times for each variable instance of a page are kept in the rasterized image cache memory 111, so that the system needs to read them only once from the rasterized image storage 113.

The Page Layout Script

The page layout script typically is generated in workstation 105. In one embodiment, the page layout script is a text (ASCII) description which is an ordered list of books. Each book includes an ordered list of pages, each page includes an ordered list of page elements, and each page element includes an ordered list of properties. In one implementation, the properties of any page element include an element identifier, a list of page numbers to which the page element belongs, and a position identifier in each page. In case of a page with multiple variable instances, the element identifier property can change for each variable instance. Although one may enter such a script manually using a text editor, one also can use an automatic script generator running on workstation 105 which is tied to a database system for variable printing. Whether written manually or with the aid of a computer based system, the page layout script is stored in disk storage, which may be the same physical unit as rasterized image storage 113. In one embodiment, the script is executed by the same processor 403 that executes the programming that implements rasterized image cache 111 and the combination system 115. In alternate embodiments, more than one processor is used. Note that no limitations to the scope of the invention are implied by the particular script syntax used in one embodiment.

The Combination System 115

The combination system 115 is implemented as a set of computer programs that operate on processor 403. In one embodiment, the combination system 115 retrieves rasterized images from the RIP system 103 which are stored in the rasterized image store 113 and combines the rasterized images for each instance of the page into a rasterized page of that instance by combining the rasterized fixed images 309 and the rasterized variable images 313 for the instance. The rasterized fixed images 309, which are stored as output fixed tiles, reside on the rasterized image store 113 along with the rasterized variable images 313 which are stored as output variable tiles. The output fixed tiles and the output variable tiles can then be read into the rasterized image cache 111 using the page layout script which maps each variable instance of one or more pages of a variable job with the corresponding rasterized images for the variable instance. The output fixed tiles and the output variable tiles corresponding to each variable instance are read into the rasterized image cache 111 and combined to form the rasterized page for that instance using the combination system 115. The rasterized page for the instance can then be sent to the printing device 117.

Although embodiments of the invention have been described in the context of parts of a page, alternative embodiments of the present invention are not limited to such contexts and may be utilized in various other applications and systems. Furthermore, embodiments are not limited to any one type of system, and thus, may be utilized in conjunction with one or a combination of other systems. In particular, the computer programs include threads that execute in parallel and communicate with each other using standard interthread communication methods. Standard interthread communication methods as known to those of ordinary skill in the art of computer programming include shared memory, mutexes, signals, pipes, etc. A read thread can be implemented to read the output fixed tiles and the output variable tiles for each variable instance from the rasterized image store 113. The output tiles are read by the read thread into the rasterized image cache 111. A combination thread can then combine the output fixed tiles with the output variable tiles for each instance.

In another embodiment, for each variable instance of the variable job, the combination system 115 fetches the output variable tiles containing the rasterized variable images 313 for the variable instance. The fetched output variable tiles can then be combined with the remaining tiles needed for the page using the output fixed tiles which contain the rasterized fixed images 309.

Apparatus for Rasterizing and Combination

Particular embodiments of the invention include an apparatus for rasterizing a job of variable printing, where the printing process generates multiple variable instances of one or more pages. Each page includes a plurality of elements of which some are fixed from instance to instance and some vary across instances. The apparatus in this particular embodiment also stores the page description files corresponding to the page elements on a file storage system 415. The RIP system 103 divides the page into a plurality of non-overlapping parts of which at least one part includes variable content that has one or more variable elements or portions thereof in at least one instance.

In one embodiment, rasterized images of parts of the page are generated by the RIP system 103 and are stored on the file storage system 415. The storage device can be a RAID subsystem in file system 415. Alternatively, a storage device can be a large high speed buffer memory device comprising a large amount of RAM for storing the raster images of multiple variable instances of one or more pages, so that this data is rapidly available for processing.

The combining process can be implemented as software running on processor 403, or as a piece of hardware circuitry, which may include a separate processor, for carrying out the function. If the combining process includes a processor and a memory, said memory includes a set of computer instructions running on said processor. This set of computer instructions causes the processor to read the page layout script and to retrieve the rasterized images as specified in the page layout script. Combining processes may also include a DMA controller with or without scatter-gather capability for speeding up the combining as described above.

Example Methods

Example methods for rasterizing a job of variable printing are described with reference to FIGS. 5-8. These example methods may be described in the general context of computer executable instructions encoded in computer readable medium. The instructions, when executed on a computer system such as system 401, implement the methods described herein. Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked through a communication network. In a distributed computing environment, computer executable instructions may be located both in local and remote computer storage media, including memory storage devices.

The example methods are illustrated as a collection of blocks in a logical flow chart representing a sequence of operations that can be implemented in hardware, software, firmware, or a combination thereof. The order in which the methods are described is not intended to be construed as a limitation, and any number of the described method blocks can be combined in any order to implement the methods, or alternate methods. Additionally, individual blocks may be deleted from the methods without departing from the spirit and scope of the subject matter described herein. In the context of software, the blocks represent computer instructions that, when executed by one or more processors, perform the recited operations.

Figure 5:
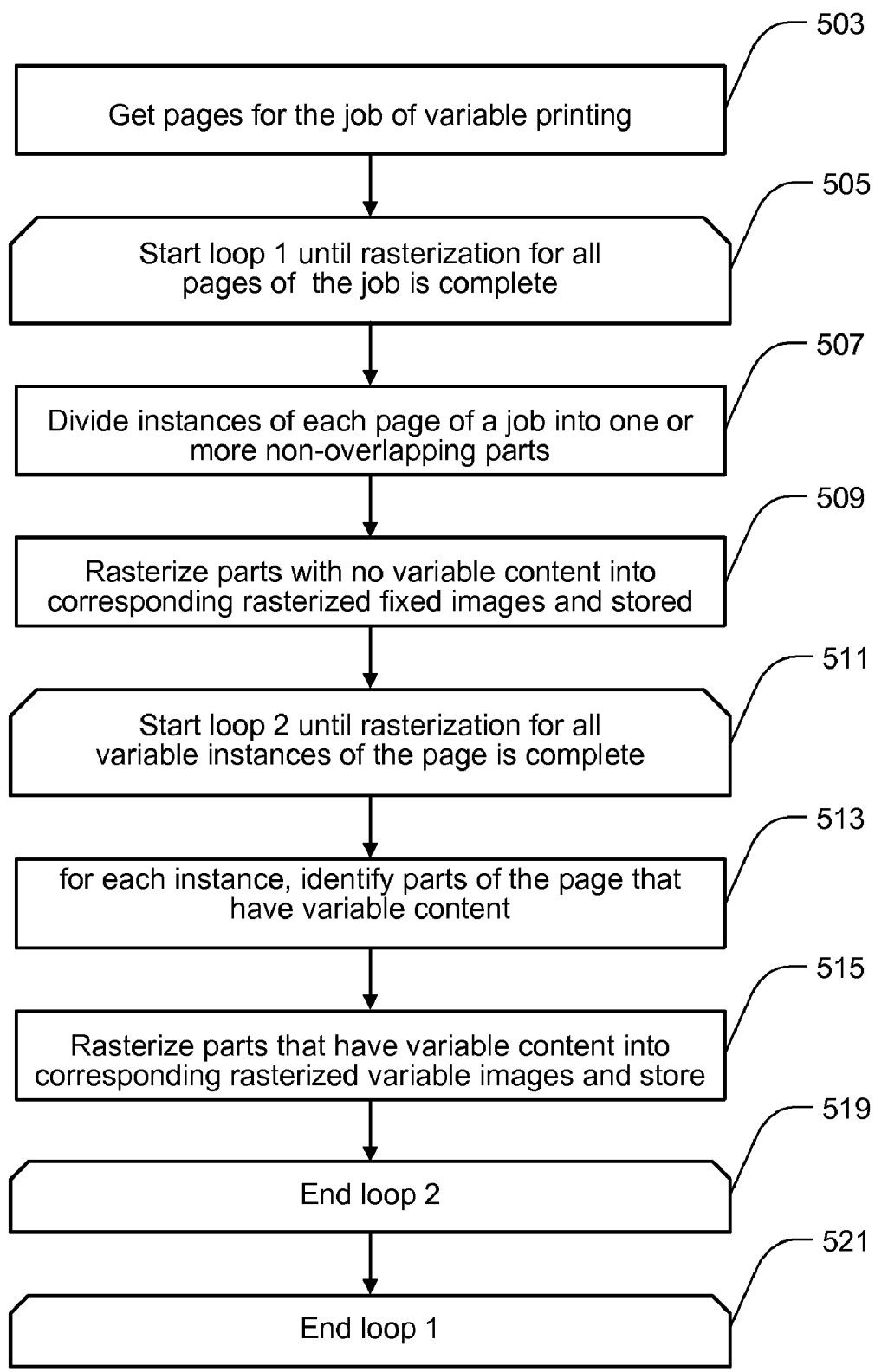
FIG. 5 illustrates example method(s) for rasterizing parts of a page having multiple variable instances into corresponding rasterized images according to an embodiment of the present example.

FIG. 5 illustrates an example method embodiment of rasterizing a job with multiple pages. Each page is divided into parts which are rasterized into corresponding rasterized images, each page having one or more variable instances. At block 503, pages for a job of variable printing are received. At least one page includes multiple elements of which some elements are fixed from instance to instance and some elements vary from instance to instance. Each job of variable printing can have at least one page with one or more variable elements. Blocks 505 and 521 define the loop limits for a loop for each page of the job. At block 507, the page is divided into a plurality of non-overlapping parts. At least one part of the multiple non-overlapping parts includes variable content in at least one variable instance. The variable content has one or more variable elements or portions thereof.

At block 509, the page with no variable content is rasterized into a rasterized fixed page. This includes rasterizing parts with no variable content into corresponding rasterized fixed images.

Block 511 and 519 define the loop limits for the rasterization process of the variable parts of page for a loop operative until for all the variable parts of the page for all instances of the page are rasterized.

At block 513, one or more parts of the plurality of parts of the page having variable content are identified. At block 515, for each part that has any variable content in any instance, each variable instance of the part is rasterized into a rasterized variable image including the variable content and the non-variable content of the instance. Block 515 also includes storing each rasterized variable image. The rasterized fixed images and the rasterized variable images are stored as output fixed tiles and output variable tiles, respectively.

At block 519, the rasterization process is stopped when all the variable instances of the page are processed. At block 521, the rasterization process is stopped when all the pages of the job for variable printing are rasterized. The rasterized fixed image and for each instance the corresponding rasterized variable images for the instance can now be combined to form the complete page. One method includes such combining.

Figure 6:
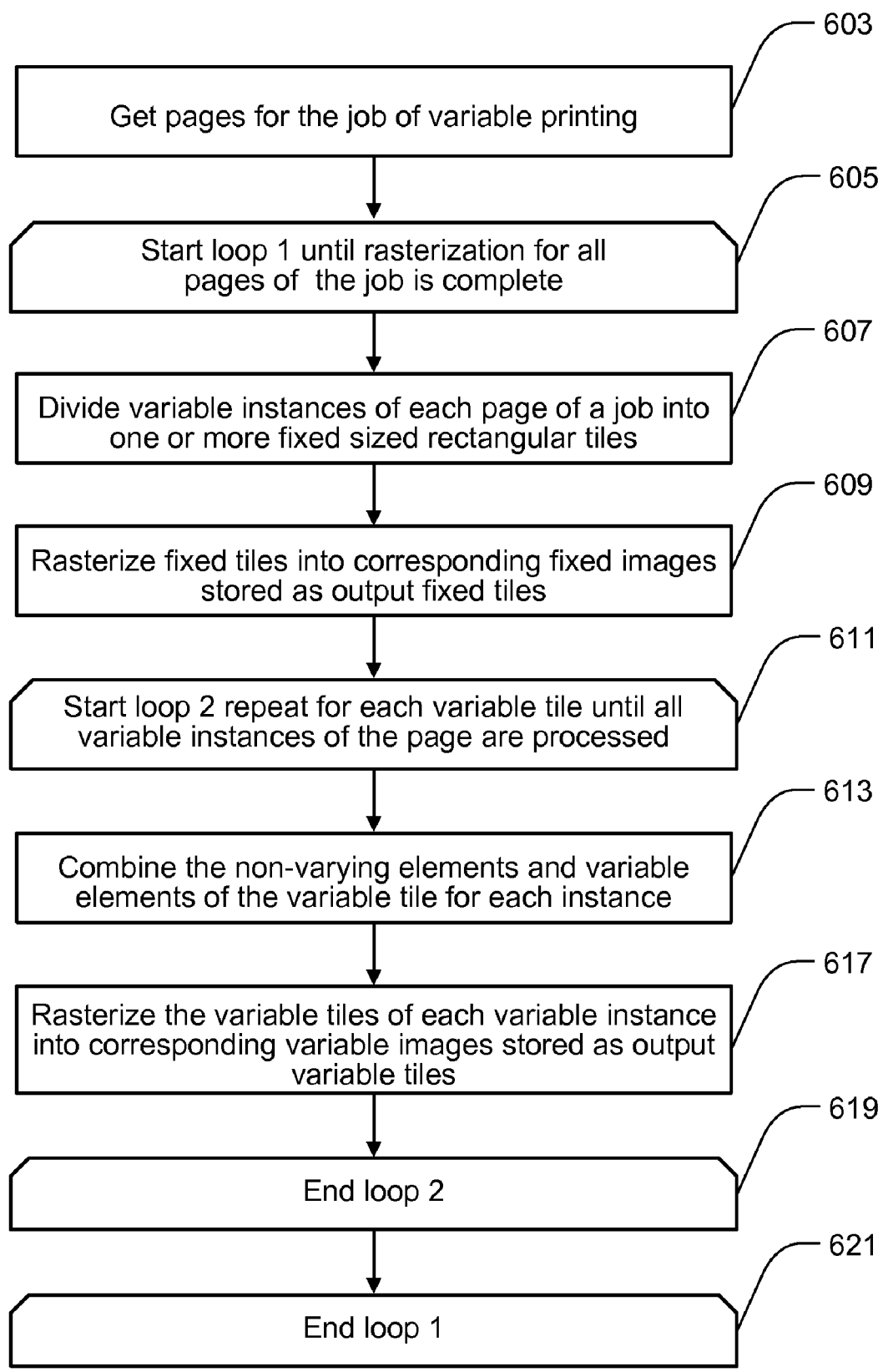
FIG. 6 illustrates example method(s) for rasterizing tiles of a page having multiple variable instances into corresponding rasterized images according to an embodiment of the present example.

FIG. 6 illustrates a version of the method that includes dividing each page into rectangular non-overlapping and abutting equally sized rectangular tiles and rasterizing the tiles of a page into corresponding rasterized images. There are multiple instances of each page, and at least one page includes content that varies between at least two instances.

Blocks 605 and 621 define the loop limits of rasterizing each page. The blocks within the loop limits are carried out until all pages have been processed. For a page that may have variable content, at block 607, the page is divided into a plurality of non-overlapping rectangular tiles of fixed size that abut each other. The tiles includes one or more fixed tiles that do not vary instance to instance and one or more variable tiles that include variable content, i.e., content that varies between at least two instances.

At block 609, the fixed tiles are rasterized into corresponding rasterized fixed images. The rasterized fixed images are stored as output fixed tiles. Blocks 611 and 619 define the loop limits of rasterizing any tiles that have content that varies across at least some instances. The blocks between the limits apply to each such variable tile.

For such a variable tile, at block 613, the variable content and any other content of the tile is combined. This includes resolving any overlaps, including layers, as the variable elements can be of different sizes across instances and can overlap with elements that do not vary from instance to instance.

At block 617, each variable instance of the page with variable elements is rasterized into a rasterized instance. This includes rasterizing for each variable instance of the page, each variable tile into a corresponding rasterized variable image that includes variable content and non-variable content of the instance. The rasterized variable images are stored as output variable tiles.

The rasterized fixed image and for each instance the corresponding rasterized variable images for the instance can now be combined to form the complete page. One method includes such combining.

Figure 7:
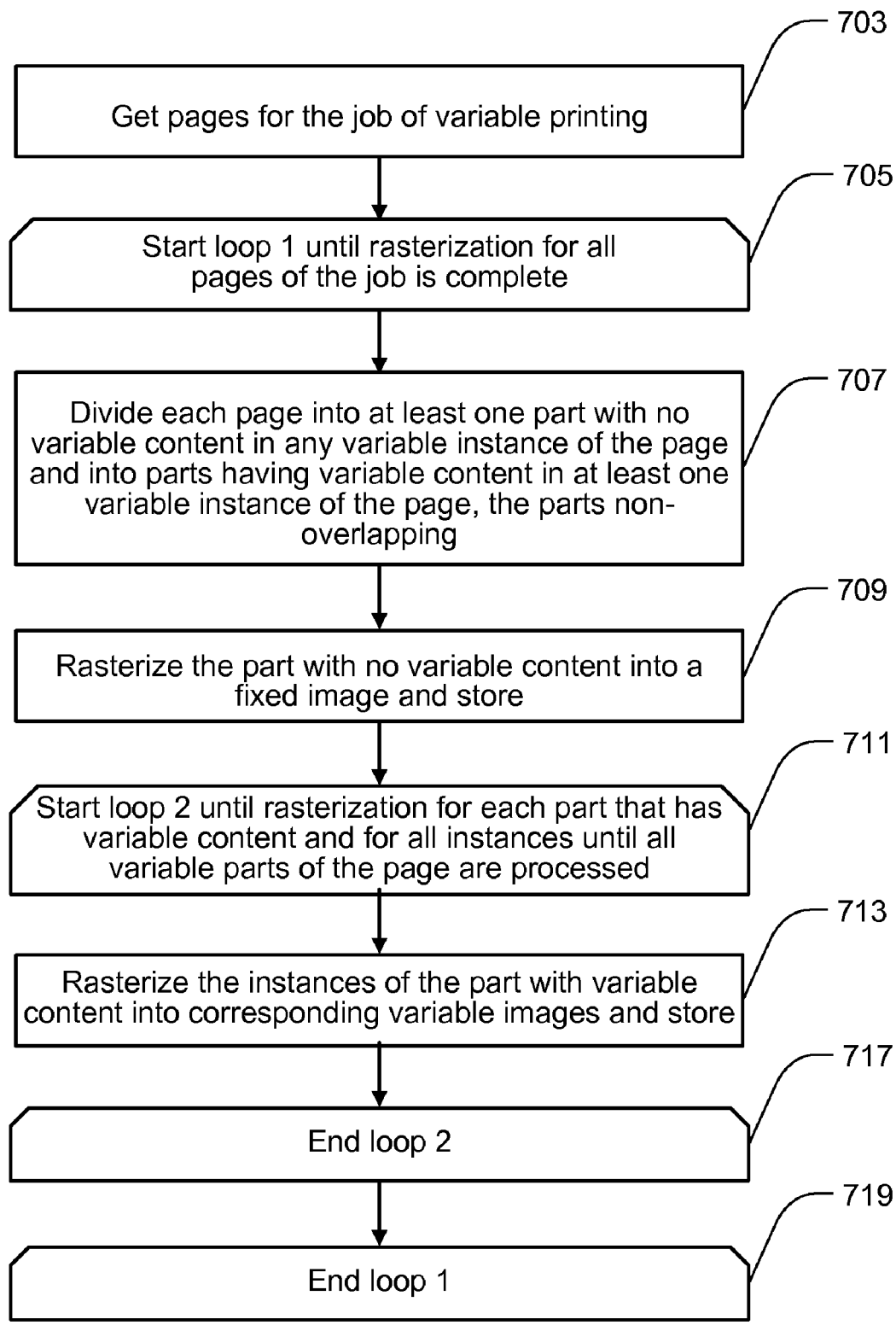
FIG. 7 illustrates example method(s) for rasterizing a part and a set of rectangular regions of a page having multiple variable instances into corresponding rasterized images

FIG. 7 illustrates an example of an alternate method embodiment for rasterizing at least one fixed part and a set of regions of a page that vary across at least two instances into corresponding rasterized images.

At block 703, pages for job of variable printing are received. Each page includes multiple elements of which some elements are fixed from instance to instance and some elements may vary across instances. Each job has at least one page that includes variable content.

Blocks 705 and 719 define the loop limits of processes that are carried out for each page to rasterize each such page into combinable parts for each instance of each page.

For each page, at block 707, the page is divided into a set of non-overlapping parts, e.g., rectangular parts that together form the page. The parts are typically not the same size. There is at least one part with content that does not vary from instant to instant and there are one or more parts having one or more elements or portions of elements that vary across at least some instances.

At block 709, the at least one part with no variable content is rasterized into a fixed image.

Blocks 711 and 717 define the loop limit for rasterizing each of the set of parts that include variable content. In 713, for each such part that includes variable content, the instances part is rasterized into corresponding rasterized variable images and stored as variable image instances.

The rasterized fixed image and for each instance the corresponding rasterized variable images for the instance can now be combined to form the complete page. One method includes such combining.

Figure 8:
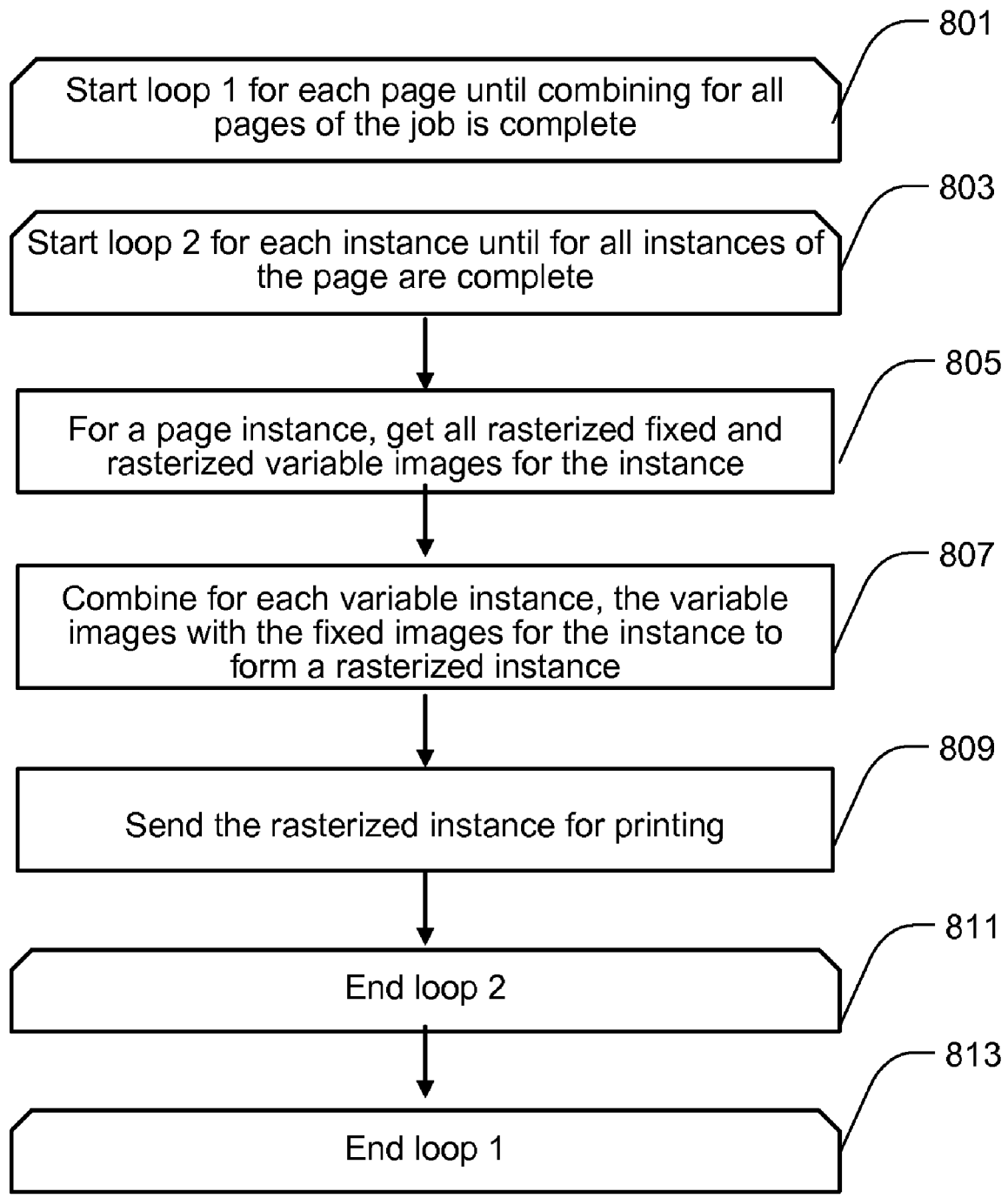
FIG. 8 illustrates example method(s) for combining rasterized images for each variable instance to form a rasterized page.

FIG. 8 illustrates an example method of combining rasterized variable and rasterized fixed images for each variable instance to form a rasterized page. Blocks 801 and 813 form the loop limits for processing the pages, and such processing is repeated for each page until all pages of the job are processed. Blocks 803 and 811 form the loop limits for processing all instances of a page, and are repeated for all instances of the page until all instances are processed. At block 805, the rasterized fixed images and the rasterized variable images for the instance of the page of variable printing are retrieved and received, e.g., retrieved from storage. This includes receiving the rasterized fixed images and the rasterized variable images for the page instance.

At block 807, the rasterized fixed images and the rasterized variable images for each instance are combined to form a rasterized instance of the page. At block 809 are sent to the printing device for printing. The methodologies described herein are, in one embodiment, performable by one or more processors that accept computer-readable (also called machine-readable) logic encoded on one or more computer-readable media containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem with a main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, unless explicitly stated otherwise, also encompasses a storage system such as a disk drive unit. The processing system in some configurations may include a sound output device, and a network interface device. The memory subsystem thus includes a computer-readable medium on which is encoded logic (e.g., software) including a set of instructions to cause, when executed by one or more processors, the performing of one or more of the methods described herein. The software may reside in the hard disk or it may also reside, completely or at least partially, within the RAM and/or within the processor during execution thereof by the computer system. Thus, the memory and the processor also constitute a computer-readable medium on which is encoded logic, e.g., in the form of instructions.

Furthermore, a computer-readable medium may form, or be included in a computer program product.

In alternative embodiments, the one or more processors operate as a standalone device or may be connected, e.g., networked to other processor(s), in a networked deployment, the one or more processors may also operate in the capacity of a server or a client machine in server-client network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the logic including instructions, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable medium on which is encoded a set of instructions, e.g., a computer program that are for execution on one or more processors, e.g., one or more processors that are part of the RIP system 103. Thus, as will be appreciated by those skilled in the art, embodiments of the present invention may be embodied as a method, an apparatus such as a special purpose apparatus, an apparatus such as a data processing system, or a tangible computer-readable medium, e.g., a computer program product. The computer-readable medium carries logic including a set of instructions that, when executed on one or more processors, causes implementing a method. Accordingly, aspects of the present invention may take the form of a method, an entirely hardware embodiment, an entirely software embodiment or an embodiment combining both software and hardware aspects. Furthermore, the present invention may take the form of medium (e.g., a computer program product on a computer-readable storage medium) configured with computer-readable program code embodied in the medium.

The software may further be transmitted or received over a network via a network interface device. While the computer readable medium is shown in an example embodiment to be a single medium, the term "computer readable medium" should be taken to include a single medium or multiple media (e.g., a centralized or distributed database, and/or associated caches and servers) that store the one or more sets of instructions. The term "computer readable medium" shall also be taken to include any medium that is capable of storing, encoding or carrying a set of instructions for execution by one or more of the processors and that cause performing any one or more of the methodologies of the present invention. A computer readable medium may take many forms, including but not limited to non-volatile media and/or volatile media. Non-volatile media includes, for example, optical, magnetic disks, and magneto-optical disks. Volatile media includes dynamic memory, such as main memory. For example, the term "computer-readable medium" shall accordingly be taken to include, but not be limited to a tangible medium such as a solid-state memory or optical or magnetic medium on which are encoded instructions, or a computer software product encoded in computer-readable tangible media It will be understood that the steps of methods discussed are performed in one embodiment by an appropriate processor (or processors) of a processing (i.e., computer) system executing instructions stored in storage. It will also be understood that embodiments of the present invention are not limited to any particular implementation or programming technique and that the invention may be implemented using any appropriate techniques for implementing the functionality described herein. Furthermore, embodiments are not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly it should be understood that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single disclosed embodiment. Thus, the claims following the DESCRIPTION OF EXAMPLE EMBODIMENTS are hereby expressly incorporated into this DESCRIPTION OF EXAMPLE EMBODIMENTS, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Unless otherwise specified, the use of the ordinal adjectives "first", "second", "third", etc., to describe a common object, merely indicate that different instances of like objects are being referred to, and are not intended to imply that the objects so described must be in any given sequence, either temporally, spatially, in ranking, or in any other manner.

All publications, patents, and patent applications cited herein are hereby incorporated by reference.

Any discussion of prior art in this specification should in no way be considered an admission that such prior art is widely known, is publicly known, or forms part of the general knowledge in the field.

In the claims below and the description herein, any one of the terms "comprising", "comprised of", or "which comprises" is an open term that means "including at least the elements/features that follow, but not excluding others." Thus, the term comprising, when used in the claims, should not be interpreted to limit the means or elements or steps listed thereafter. For example, the scope of the expression, "a device comprising A and B" should not be limited to devices consisting only of elements A and B. Any one of the terms "including" or "which includes" or "that includes" as used herein is also an open term that also means "including at least the elements/features that follow the term, but not excluding others." Thus, "including" is synonymous with and means comprising.

Thus, while there has been described what are believed to be preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Hence, although this invention has been described with respect to specific embodiments, those embodiments are illustrative only. No limitation with respect to the embodiments is intended or should be inferred. Numerous variations and modifications may be effected without departing from the true spirit and scope of the novel concept of the invention, and it is intended that the scope of the invention be defined by the claims appended hereto.

I claim:

1. A method of operating a processing system to process a job for printing, the printing to generate multiple variable instances of one or more pages, at least one page including a plurality of elements of which some are fixed from instance to instance, and some may vary from instance to instance, the method comprising:

for a page that has one or more variable elements and one or more elements that are fixed from instance to instance, dividing the page into a plurality of non-overlapping parts, of which at least one non-overlapping part includes variable content that has one or more variable elements or portions thereof in at least one instance, such that both the parts that have fixed elements or portions thereof from instance to instance, and the one or more parts that have variable elements or portions thereof are non-overlapping;

rasterizing the page with no variable content present into a rasterized fixed page of non-overlapping parts that includes, for at least any non-overlapping part that has no variable content, a rasterized fixed image of the non-overlapping part with no variable content, such that the element or elements that are fixed from instance to instance are combinable into one rasterized fixed page;

identifying one or more non-overlapping parts that include variable content; and rasterizing each instance of the page with the variable elements of the page instance into a rasterized set of non-overlapping instance parts that includes for each non-overlapping part that has variable content a rasterized variable image of the non-overlapping part that includes the variable content and any non-variable content of the instance of the part;

such that, for each instance, the rasterized fixed images of non-overlapping parts and the rasterized variable images of non-overlapping parts of the instance are combinable to form a rasterized instance of the page.

2. A method as recited in claim 1, wherein the parts are rectangular tiles of a fixed size, such that the tiles include fixed tiles and variable tiles, the fixed tiles corresponding to parts of the page with no variable content present and the variable tiles corresponding to the parts that have variable content.

3. A method as recited in claim 1, wherein the rasterizing each instance of the page into a rasterized instance includes: for each part that has variable content, combining the non-variable with the variable content of the part to form a combined part, and rasterizing the combined part into the rasterized variable image.

4. A method as recited in claim 1, wherein the rasterizing each instance of the page into a rasterized instance includes: for each part that has variable content, rasterizing the variable content of the part excluding any fixed content to form a combined variable part, and combining the combined variable part with a corresponding rasterized fixed image to form the rasterized variable image.

5. A method as recited in claim 1, wherein the elements are defined in a Page Description Language file.

6. A method as recited in claim 1, wherein identifying of the parts that have variable content is carried out on an instance by instance basis, and wherein the rasterizing of each instance of the page with the variable elements of the instance includes processing only parts of the page instance that have one or more variable elements or portions of variable elements.

7. A method as recited in claim 1,
wherein the parts are rectangular tiles of a fixed size, such that the tiles include fixed tiles and variable tiles, the fixed tiles corresponding to the parts of the page with no variable content present and the variable tiles corresponding to the parts that have variable content, and
wherein the process of rasterizing each instance of the page into a rasterized instance includes combining the non-variable content with the variable content for each variable tile to form a combined tile, and rasterizing the combined tile into the rasterized variable image.

8. A method as recited in claim 1,
wherein the parts are rectangular tiles of a fixed size, such that the tiles include fixed tiles and variable tiles, the fixed tiles corresponding to the parts of the page with no variable content present and the variable tiles corresponding to the parts that have variable content, and
wherein the rasterizing each instance of the page into a rasterized instance includes for each tile rasterizing the variable content of tile excluding any fixed content to form a variable only image, and combining the variable only image with a corresponding rasterized fixed image to form the rasterized variable image.

9. A method as recited in claim 6, wherein rasterizing the page with no variable content present includes storing the fixed images in output fixed tiles and the rasterizing each instance of the page with the variable elements includes storing the rasterized variable images in output variable tiles.

10. A method as recited in claim 9, further comprising: for each instance of a page, identifying the output fixed tiles and the output variable tiles corresponding to that instance and combining the identified output fixed tiles and the output variable tiles to form a rasterized page of that instance.

11. A method as recited in claim 9, further comprising:
applying color management to the parts that have one or more variable elements or portions thereof, such that the rasterized variable portions are stored after color management;
applying color management to the page without variable content present, such that the rasterized fixed tiles are stored after color management; and
for each instance of a page, identifying the stored output fixed tiles and the stored output variable tiles corresponding to that instance and combining the identified output fixed tiles and the output variable tiles to form a rasterized page of that instance.

12. A method as recited in claim 1,
wherein the identifying of one or more parts of the plurality of parts of the page that have variable content defines rectangular regions that each has variable content in at least one instance, and defines at least one part that has no variable content in any instance, each of the rectangular regions that have variable content in at least one instance having a location and size,
wherein the rasterizing the page with no variable content includes only rasterizing one or more parts that have no variable content in any instance, and
wherein the rasterizing each instance of the page with the variable elements of the page instance includes rasterizing all the rectangular regions of the page.

13. A method as recited in claim 12, further including:
generating a fixed image for the part that has no variable elements; and
generating a set of images for the set of rectangular regions for each page instance.

14. A method as recited in claim 13, wherein for each page instance, the fixed image is combined with the set of images of the page instance.

15. An apparatus that includes one or more processors and that is operative to generate multiple variable instances of one or more pages for an output device such as a printer, at least one page including a plurality of elements of which some are fixed across instances, and some may vary from instance to instance, the apparatus comprising:
a part former configured to divide, using at least one of the processors, a page that has one or more variable elements and one or more elements that are fixed from instance to instance into a plurality of non-overlapping parts, of which at least one non-overlapping part includes variable content that has one or more variable elements or portions thereof in at least one instance, wherein both the parts that have fixed elements or portions thereof from instance to instance, and the one or more parts that have variable elements or portions thereof are non-overlapping; and
a rasterizer coupled to the part former and configured, using at least one of the processors, to:
rasterize the page with no variable content present into a rasterized fixed page of non-overlapping parts that includes for at least any non-overlapping part that has no variable content a rasterized fixed image of the non-overlapping part with no variable content, such that the element or elements that are fixed from instance to instance are combinable into one rasterized fixed page;
identify one or more non-overlapping parts of the page that include variable content; and
rasterize each instance of the page with the variable elements of the page instance into a rasterized set of non-overlapping instance parts that includes for each non-overlapping part that has variable content a rasterized variable image that includes the variable content and any non-variable content of the instance of the non-overlapping part;
such that, for each instance, the rasterized fixed images of non-overlapping parts and the rasterized variable images of non-overlapping parts of the instance are combinable to form a rasterized instance of the page.

16. An apparatus as recited in claim 15, wherein the parts are rectangular tiles of a fixed size of which some tiles are fixed tiles that correspond to the parts that have no variable content, and some tiles are variable tiles that correspond to the parts that have variable content.

17. An apparatus as recited in claim 15, wherein the parts are rectangular tiles of a fixed size, such that the tiles include fixed tiles and variable tiles, the fixed tiles corresponding to the parts of the page with no variable content present and the variable tiles corresponding to the parts that have variable content, and
wherein the rasterizer is further configured to rasterize, for each variable instance, using at least one of the processors, the non-variable and the variable content of each variable tile into the rasterized variable image.

18. An apparatus as recited in claim 15, wherein the parts are rectangular tiles of a fixed size, such that the tiles include fixed tiles and variable tiles, the fixed tiles corresponding to the parts of the page with no variable content present and the variable tiles corresponding to the parts that have variable content, and
wherein the rasterizer is further configured to:
discard, using at least one of the processors, any fixed content of the variable tile while rasterizing the variable tile with variable content;
process, using at least one of the processors, the variable content of the variable tile to form a variable only image; and
combine, using at least one of the processors, the variable only image with a corresponding rasterized fixed image to form the rasterized variable image.

19. An apparatus as recited in claim 15, wherein the rasterizer is further configured to store the rasterized fixed images in output fixed tiles and store the rasterized variable images for each variable instance in output variable tiles.

20. An apparatus as recited in claim 15, further comprising a combiner configured to combine, using at least one of the processors, for each instance, the rasterized fixed images stored as output fixed tiles, with the rasterized variable images for the instance stored as output variable tiles to form a rasterized page of the instance.

21. A tangible computer readable storage medium on which are encoded instructions that when executed by one or more processors of a processing system carry out a method of processing a job for printing, the printing to generate multiple variable instances of one or more pages, at least one page including a plurality of elements of which some are fixed from instance to instance, and some may vary from instance to instance, the method comprising:
for a page that has one or more variable elements and one or more elements that are fixed from instance to instance,
dividing the page into a plurality of non-overlapping parts, of which at least one non-overlapping part includes variable content that has one or more variable elements or portions thereof in at least one instance, such that both the parts that have fixed elements or portions thereof from instance to instance, and the one or more parts that have variable elements or portions thereof are non-overlapping;
rasterizing the page with no variable content present into a rasterized fixed page of non-overlapping parts that includes, for at least any non-overlapping part that has no variable content, a rasterized fixed image of the non-overlapping part with no variable content, such that the element or elements that are fixed from instance to instance are combinable into one rasterized fixed page;
identifying one or more non-overlapping parts that include variable content; and
rasterizing each instance of the page with the variable elements of the page instance into a rasterized set of non-overlapping instance parts that includes for each non-overlapping part that has variable content a rasterized variable image of the non-overlapping part that includes the variable content and any non-variable content of the instance of the part;

such that, for each instance, the rasterized fixed images of non-overlapping parts and the rasterized variable images of non-overlapping parts of the instance are combinable to form a rasterized instance of the page.

22. A tangible computer readable storage medium as recited in claim 21, wherein the parts are rectangular tiles of a fixed size, such that the tiles include fixed tiles and variable tiles, the fixed tiles corresponding to parts of the page with no variable content present and the variable tiles corresponding to the parts that have variable content.

23. A tangible computer readable storage medium as recited in claim 22, wherein the rasterizing the fixed tiles includes storing the rasterized fixed images in output fixed tiles and the rasterizing the variables tiles includes storing the rasterized variable images in output variable tiles, further wherein for each instance of the page, the identified output fixed tiles and the output variable tiles corresponding to that instance are combined to form a rasterized page of that instance.

24. A tangible computer readable storage medium as recited in claim 21,
wherein the identifying of one or more parts of the plurality of parts of the page that have variable content defines rectangular regions that each has variable content in at least one instance, and defines at least one part that has no variable content in any instance, each of the rectangular regions that have variable content in at least one instance having a location and size,
wherein the rasterizing the page with no variable content includes only rasterizing one or more parts that have no variable content in any instance, and
wherein the rasterizing each instance of the page with the variable elements of the page instance includes rasterizing all the rectangular regions of the page.

25. A tangible computer readable storage medium as recited in claim 24, wherein the method further comprises:
generating a fixed image for the part that has no variable content;
generating a set of images for the rectangular regions for each variable instance; and
combining for each variable instance, the fixed image with the set of images for the variable instance.

26. A system for processing a job for printing, the printing to generate multiple variable instances of one or more pages, at least one page including a plurality of elements of which some elements are fixed across instances of the page and some elements vary from instance to instance, the system comprising:
tangible means for dividing a page into a plurality of non-overlapping parts, of which, in the case the page includes one or more variable elements, at least one part includes variable content that has one or more variable elements or portions thereof in at least one instance, such that both the parts that have fixed elements or portions thereof from instance to instance, and the one or more parts that have variable elements or portions thereof are non-overlapping;
tangible means for rasterizing the non-overlapping parts of the page with no variable content into corresponding rasterized fixed images of the non-overlapping part with no variable content, such that the element or elements that are fixed from instance to instance are combinable into one rasterized fixed page;
tangible means for deducing one or more non-overlapping parts of the plurality of non-overlapping parts of each variable instance of the page that have variable content; and
tangible means for rasterizing the non-overlapping parts with variable content for each instance of the page into corresponding rasterized variable images of the non-overlapping parts including, for each non-overlapping part with variable content, the variable content and any non-variable content of the non-overlapping part,
such that, for each instance, the rasterized fixed images of non-overlapping parts and the rasterized variable images of non-overlapping parts of the instance are combinable to form a rasterized instance of the page.

27. A system as recited in claim 26, wherein said tangible means for rasterizing of each part that has variable content comprises means for rasterizing the variable content of the part excluding any fixed content to form a combined variable part, and combining the combined variable part with a corresponding rasterized fixed image to form a rasterized variable image.

28. A system as recited in claim 27, wherein said tangible means for rasterizing further comprises means for combining the rasterized fixed images with identified rasterized variable images for each variable instance to form a rasterized page for the instance.

* * * * *